United States Patent
Goel

(10) Patent No.: US 8,665,841 B1
(45) Date of Patent: Mar. 4, 2014

(54) MULTIPLE SIMULTANEOUS MESH ROUTES

(75) Inventor: Sandesh Goel, Nagar (IN)

(73) Assignee: Marvell International Ltd. (BM)

( * ) Notice: Subject to any disclaimer, the term of this patent is extended or adjusted under 35 U.S.C. 154(b) by 477 days.

(21) Appl. No.: 12/468,678

(22) Filed: May 19, 2009

Related U.S. Application Data

(60) Provisional application No. 61/088,395, filed on Aug. 13, 2008.

(51) Int. Cl.
   *H04W 4/00* (2009.01)
(52) U.S. Cl.
   USPC .......... 370/338; 370/327; 370/328; 455/11.1; 455/41.2
(58) Field of Classification Search
   None
   See application file for complete search history.

(56) References Cited

U.S. PATENT DOCUMENTS

| | | | | |
|---|---|---|---|---|
| 6,954,435 | B2 * | 10/2005 | Billhartz et al. | 370/252 |
| 7,177,295 | B1 * | 2/2007 | Sholander et al. | 370/338 |
| 7,280,483 | B2 * | 10/2007 | Joshi | 370/238 |
| 7,787,361 | B2 * | 8/2010 | Rahman et al. | 370/217 |
| 7,864,682 | B2 * | 1/2011 | Appaji et al. | 370/235 |
| 2007/0097892 | A1 * | 5/2007 | Tsang | 370/310 |
| 2007/0115828 | A1 * | 5/2007 | Ahuja et al. | 370/236 |
| 2008/0056125 | A1 * | 3/2008 | Kneckt et al. | 370/229 |
| 2010/0278069 | A1 * | 11/2010 | Sharma et al. | 370/254 |

OTHER PUBLICATIONS 802.11h™; "IEEE Standard for Information technology—Telecommunications and information exchange between systems—Local and metropolitan area networks—Specific requirements Part 11: Wireless LAN Medium Access Control (MAC) and Physical Layer (PHY) specifications; Amendment 5: Spectrum and Transmit Power Management Extensions in the 5 GHz band in Europe"; IEEE Computer Society; Oct. 14, 2003; 75 pgs.

Syed Aon Mujtaba, Agere Systems; "IEEE P802.11 Wireless LANs"; doc.: IEEE802.11-04/0889r6; May 2005; 131 pgs.

802.16™, "IEEE Standard for Local and metropolitan area networks Part 16: Air Interface for Fixed Broadband Wireless Access Systems"; IEEE Computer Society and the IEEE Microwave Theory and Techniques Society; Apr. 8, 2002; 349 pgs.

802.16a™, "IEEE Standard for Local and metropolitan area networks Part 16: Air Interface for Fixed Broadband Wireless Access Systems—Amendment 2: Medium Access Control Modifications and Additional Physical Layer Specifications for 2-11GHz"; IEEE Computer Society and the IEEE Microwave Theory and Techniques Socieyty; Apr. 1, 2003; 318 pgs.

IEEE P802.11s™/D1.00 Draft Amendment to Standard for Information Technology—Telecommunications and Information Exchange Between Systems—LAN/MAN Specific Requirements—Part 11: Wireless medium Access Control (MAC) and physical layer (PHY) specification: Amendment: ESS Mesh Networking; Nov. 2006; 243 pgs.

(Continued)

*Primary Examiner* — Ian N Moore
*Assistant Examiner* — Brian T Le

(57) ABSTRACT

A device within a first mesh node includes a data interface that receives a data frame and a frame generation module that generates a plurality of route request frames based on a type of data within the data frame where each of the plurality of route request frames is used to discover at least one route between the first mesh node and a second mesh node.

15 Claims, 7 Drawing Sheets

(56) References Cited

OTHER PUBLICATIONS

IEEE Std. 802.11a—1999; "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 Ghz Band"; The Institute of Electrical and Electronics Engineers, Inc.; Dec. 30, 1999; 91 pgs.

"Draft 802.20 Permanent Document <System Requirements for IEEE 802.20 Mobile Broadband Wireless Systems—Version 14>"; IEEE P 802.20™ V14; Jul. 16, 2004; 24 pgs.

International Standard; ISO/IEC 8802-11; ANSI/IEEE Std 802.11, First edition 1999-00-00; Information technology—Telecommunications and information exchange between systems—Local and metropolitan area networks—Specific requirements—Part 11: Wireless LAN Medium Access Control (MAC) and Physical Layer (PHY) specifications; Std 802.11, 1999 edition; Aug. 20, 1999; 531 pgs.

802.16e™; "IEEE Standard for Local and metropolitan area networks Part 16: Air Interface for Fixed Broadband Wireless Access Systems—Amendment 2: Physical and Medium Access Control Layers for Combined Fixed and Mobile Operation in Licensed Bands and Corrigendum 1"; IEEE Computer Society and the IEEE Microwave Theory and Techniques Society; Feb. 28, 2006, 863 pgs.

802.16™;"IEEE Standard for Local and metropolitan area networks Part 16: Air Interface for Fixed Broadband Wireless Access System"; IEEE Computer Society and the IEEE Microwave Theory and Techniques Society; Oct. 1, 2004; 892 pgs.

IEEE Std. 802.11b—1999/Corrigendum Jan. 2001; "IEEE Standard for Information technology—Telecommunications and information exchange between systems—Local and metropolitan area networks—Specific requirements—Part 11: Wireless LAN Medium Access Control (MAC) and Physical Layer (PHY) specification—Amendment 2: Higher-speed Physical layer (PHY) extension in the 2.4 GHz band—Corrigendum 1"; IEEE Computer Society; Nov. 7, 2001; 23 pgs.

IEEE P802.11g/D8.2 DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003 IEEE; 69 pgs.

\* cited by examiner

| DA | Route Attribute | Default | Next Hop |
|---|---|---|---|
| 14-10 | Min Latency | No | 14-8 |
| 14-10 | Max Throughput | Yes | 14-6 |

MULTIPLE SIMULTANEOUS MESH ROUTES

RELATED APPLICATION

The present application claims the benefit under 35 USC 119(e) of U.S. Provisional Application No. 61/088,395, filed on Aug. 13, 2008, the contents of which are incorporated herein by reference in its entirety:

BACKGROUND

1. Technical Field

The present disclosure relates generally to wireless mesh networks and, more particularly, to providing enhanced transmission routes within a wireless mesh network.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In recent years, the use of wireless mesh networks has increased in order to improve the range of wireless communications while reducing power consumption. Wireless mesh networks typically include a plurality of wireless mesh nodes that communicate with one another to route data. For example, in wireless multi-hop mesh networks, data is propagated from a source mesh node, or an originating mesh node, to a destination mesh node by "hopping" from one mesh node to another until the data reaches the destination mesh node. As such, each mesh node within a wireless mesh network operates as both a receiver and transmitter to communicate data between intervening mesh nodes within a given route.

When a source node desires to transmit data to a destination node, the source node utilizes a route discovery mechanism to "discover" or establish a route to the destination node. A route between the source node and the destination node is selected in an effort to minimize the associated cost of the route. In wireless mesh networks, factors considered in a cost of route determination include, but are not limited to, path length, hop count, latency, and/or throughput. The selected route is then utilized for the data transmission from the particular source node to the particular destination node until the route is refreshed (i.e., until a subsequent route determination operation is performed). This determination of the selected route may reduce the performance of wireless mesh networks. Therefore, a need exists to improve the determination of the route for a wireless mesh network.

BRIEF SUMMARY

The present invention is defined by the following claims, and nothing in this section should be taken as a limitation on those claims.

By way of introduction, the embodiments below provide a device within a first mesh node that includes a data interface that receives a data frame and a frame generation module that generates a plurality of route request frames based on a type of data within the data frame, where each of the plurality of route request frames is used to discover at least one route between the first mesh node and a second mesh node.

A computer-readable storage medium that stores a computer program includes instructions for causing a processor to receive a data frame and generate a plurality of route request frames based on a type of data within the data frame where each of the plurality of route request frames is used to discover at least one route between a first mesh node and a second mesh node.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The embodiments will now be described with reference to the attached drawings.

DETAILED DESCRIPTION

Figure 1:
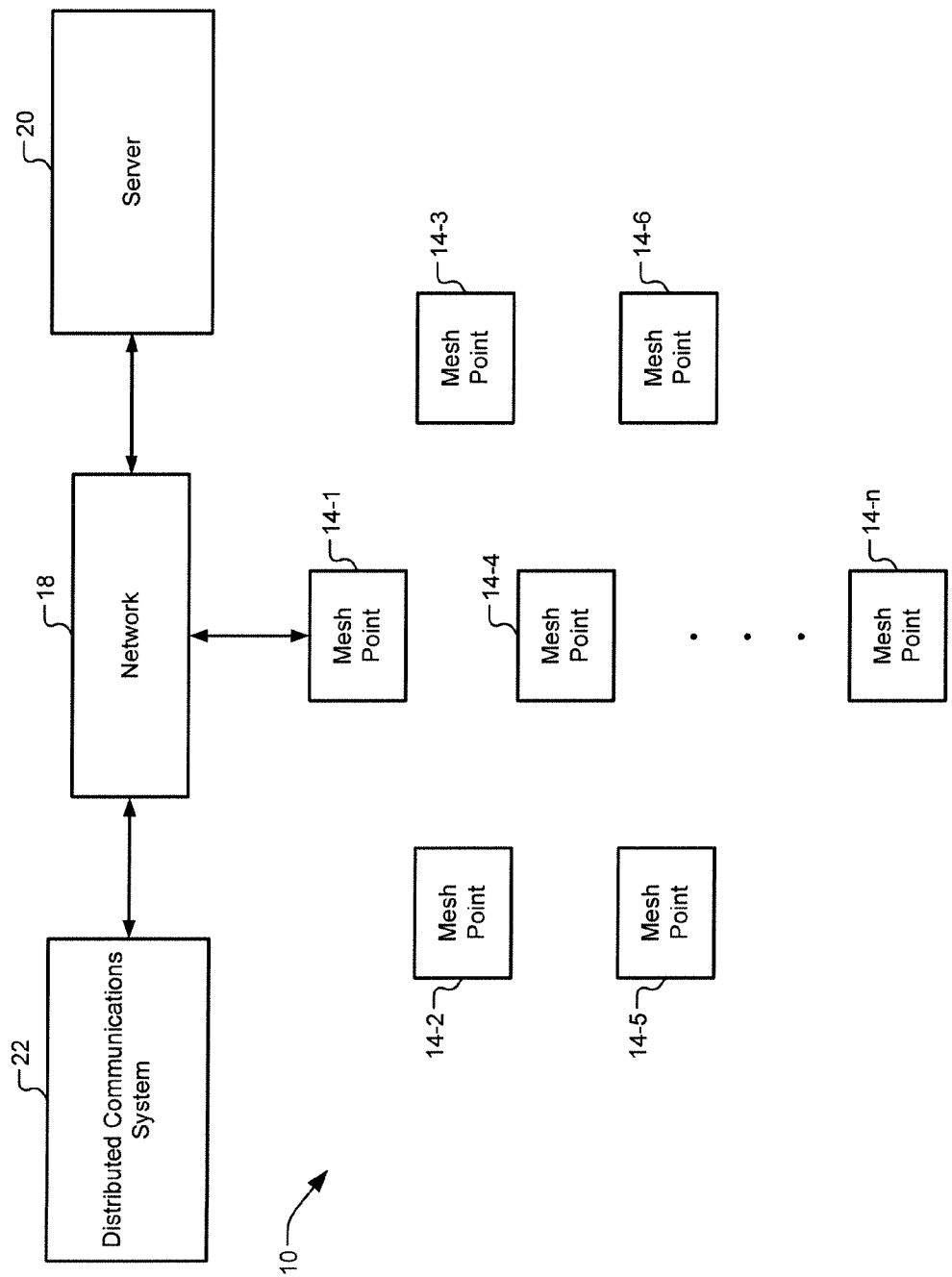
FIG. 1 is a functional block diagram of an exemplary wireless mesh network according to the present disclosure.

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views. The following description is merely exemplary in nature and is in no way intended to limit the disclosure, its application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

As discussed in the background, when a source node desires to transmit data to a destination node, the source node utilizes a route discovery mechanism to "discover" or establish a route to the destination node. The route between the source node and the destination node is selected in an effort to minimize the associated cost of the route. Conventionally, when a source node wishes to transmit data to a destination node within a mesh network, the source node references an internal forwarding or routing table to determine whether a valid route (i.e., an unexpired route) exists to the destination node. In multi-hop mesh networks, forwarding tables provide a MAC address of the next mesh node (i.e., the next "hop") along a given route to the destination node. Typically, forwarding tables may include information such as, but not limited to, a MAC address of the destination node, a route metric value, and the next hop MAC address (i.e. a MAC address of the next mesh node in the given path). The route metric value represents a numeral indicative of the "cost" of the given route. In other words, the route metric value represents an evaluation of a distinct route operating parameter (e.g., path length, hop count, latency, or throughput) that reflects the performance of the given route.

If the source node determines that no valid route to the destination node exists, the source node initiates a route discovery operation to establish a route to the destination node by broadcasting a route request frame within the mesh network. The route request frame is propagated through the mesh network to discover available routes between the source node and the destination node and an associated cost of each route. Typically, each intermediate node that receives a transmission of the broadcasted route request frame updates a route metric within the respective route request frame, thereby incorporating the cost associated with the link between the source node and the respective intermediate node. Each intermediate node then proceeds to further propagate the route request frame such that the process described above is repeated until the route request frame reaches the destination node.

Upon receiving the route request frame(s) forwarded through the mesh network, the destination node may select a single route based on an evaluation of the received route metric(s). Furthermore, in response to the route request frame(s), the destination node transmits a route reply frame to the source node. Forwarding tables at each intermediate node within the selected route are populated based on the route reply frame, thereby establishing a single route for subsequent data transmissions between the particular source and destination nodes.

In other words, conventional route discovery protocols establishes a single, unique route between any pair of mesh nodes within a given mesh network. Thus, the conventional route discovery protocols only generate a single route from a particular source node to a particular destination node. This single route discovery often is not ideal for all applications (e.g., voice-over-IP, streaming video, email, etc.) and types of data traffic (e.g., voice and image traffic). As a result, the performance of wireless mesh networks suffers due to the utilization of routes that fail to consider the requirements of diverse applications and types of data traffic. Specifically, this technique of route discovery limits the ability of a mesh network to evaluate various quality of service (QoS) considerations when routing data through the mesh network. As such, all data traffic (e.g., voice traffic and video traffic) originating at a given node and destined for a particular node is confined to a single path regardless of traffic requirements presented by the respective types of data which results in a degradation of the overall mesh network performance.

By way of introduction, the embodiments described herein are related to wireless mesh networks that include wireless mesh network devices such as mesh points and mesh portals, commonly referred to as mesh nodes that employ route discovery operations and are merely exemplary in nature. More particularly, each mesh node includes a transceiver circuit (e.g., a RF transceiver) and/or a system-on-chip circuit (SOC) that implements(s) route discovery operations to determine a data transmission route or path based on the particular type of data transmitted between a source node and a destination within a wireless mesh network. The present disclosure describes a route discovery system that establishes simultaneous data transmission routes between the source node and the destination node, each optimized for the data traffic requirements of a particular type of data, thereby enhancing the quality of service (QoS) provided by a wireless mesh network.

Referring now to FIG. 1, an exemplary wireless mesh network 10 is shown. Wireless communications of the wireless mesh network 10 may be compliant with various protocols including at least one of the Institute of Electrical and Electronics Engineers (IEEE) standards 802.11, 802.11a, 802.11b, 802.11g, 802.11h, 802.11k, 802.11n, 802.11s, 802.16, 802.16a, 802.16e, 802.16-2004, and 802.20, and/or the Bluetooth standard published by the Bluetooth Special Interest Group (SIG). The aforementioned standards are hereby incorporated by reference in their entirety and are referenced for exemplary purposes only.

The wireless mesh network 10 includes a plurality of mesh nodes 14-1, 14-2 . . . and 14-$n$, referred to collectively as the mesh nodes 14. Each of the mesh nodes 14 may communicate with one another via wireless mesh links (not shown) over a wireless communication medium (e.g., over-the-air). Each mesh node 14 within the mesh network 10 may serve as both a receiver and transmitter to communicate data between the mesh nodes 14. In other words, each of the mesh nodes 14 may constitute a source node, a destination node, or an intermediate node (i.e., a node within a given route through which information passes) within the mesh network 10.

The mesh network 10 may include one or more mesh nodes 14 (e.g., 14-1) that provide a connection to a wired network (e.g., network 18) and are commonly referred to as mesh portals. Mesh portals provide a gateway enabling data to be relayed between the mesh nodes 14 and various wired devices (not shown) of the network 18. Users of various wireless devices (not shown) within the mesh network 10 may communicate with one another via the mesh nodes 14. The wireless devices may include, but are not limited to, a desktop computer, a personal digital assistant (PDA), a mobile phone, a laptop, a personal computer (PC), a printer, a digital camera, an internet protocol (IP) phone. The network 18 may be a local area network (LAN), a wide area network (WAN), or another network configuration. The network 18 may include other nodes such as a server 20 and may be connected to a distributed communications system 22 such as the Internet.

Figure 2:
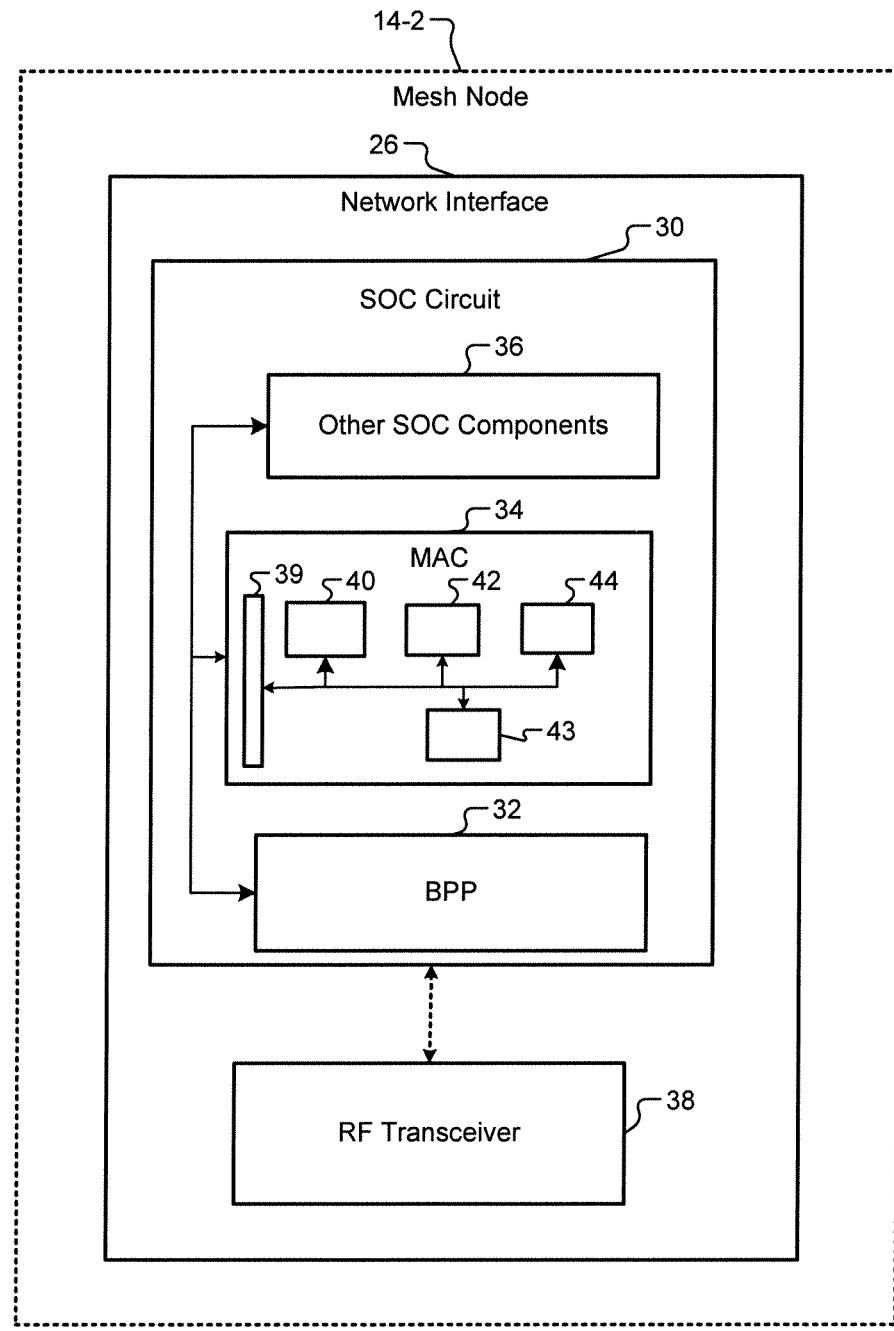
FIG. 2 is a functional block diagram of an exemplary mesh node including a network interface according to the present disclosure.

Referring now to FIG. 2, an exemplary mesh node 14 is shown in more detail. Those skilled in the art will appreciate that each of the mesh nodes 14 respectively include the elements described herein with reference to FIG. 2. The mesh node is shown to include a network interface 26. A SOC circuit 30 of the network interface 26 includes a baseband processor (BBP) 32, a media access control (MAC) device 34, and other SOC components, identified collectively at 36, such as interfaces, firmware, memory, and/or other processors. A radio frequency (RF) transceiver 38 along with the BBP 32 communicates with the MAC device 34. BBP 32 processes signals received from and/or transmitted to the RF transceiver 38. The RF transceiver 38 modulates signals received from the BBP 32 and demodulates signals prior to transmitting the signals to the BBP 32. Additionally the RF transceiver 38 transmits/receives frames (e.g., voice data and/or video data) to/from various other mesh nodes 14 in the exemplary mesh network 10. Each of the mesh nodes 14 may transmit data streams having various types of frames and/or data structures.

In the present implementation, the MAC device 34 is configured to execute MAC layer operations such as establishing, supervising, and maintaining communications between the exemplary mesh node 14 and the other mesh nodes 14. More specifically, the MAC layer may perform operations including, but not limited, establishing at least one route for transmitting information (e.g., messages, packets, and/or data) between a source node and a destination node within the mesh network 10.

In the present implementation, the MAC device 34 includes, but is not limited to, a data interface 39, a frame generation module 40, route discovery module 42, a forwarding module 43, and a forwarding table 44. The data interface 39, the frame generation module 40, the route discovery module 42, the forwarding module 43, and the forwarding table 44 selectively communicate with the BBP 32, the other SOC components 36, as well as the RF transceiver 38. The data interface 39 receives and transmits data frames to and from the MAC device 34. The frame generation module 40, the route discovery module 42, and the forwarding table 44 may operate in combination to define simultaneous routes between a source node (e.g., mesh node 14-2) and a destination node (e.g., mesh node 14-10) within the mesh network 10 in accordance with the present disclosure. The forwarding module 43, as described in further detail below, utilizes the simultaneous routes in order to enhance the quality of service (QoS) provided by the mesh network 10 for a given type of data. Specifically, at least one route between the source node and the destination node is established based on a particular route parameter or attribute as discussed in detail below.

In the present implementation, the frame generation module 40 generates various frames such as data frames, control frames, and/or management frames for propagation through the mesh network 10. For example, when the MAC device 34 initiates a route request operation, the frame generation module 40 generates a route request frame based on the type of data frame that the source node wishes to transmit to the destination node. Specifically, the frame generation module 40 may process a traffic identifier (TID) field embedded within the data frame.

A TID value within the TID field indicates a traffic category of the associated payload of the data frame. The traffic category is indicative of the transmission priority given to the associated payload for communication of a given communication link. For example, when transmitting voice data, it is generally preferable to transmit the voice data along a route within a mesh network that minimizes latency (i.e., high priority). When transmitting video data, it may be preferable to transmit the video data along a route which maximizes overall bandwidth utilization (i.e., greater throughput but lower priority) of a given communication link. Thus, different criteria may be relevant in selecting the route depending on the type of data transmitted. Those skilled in the art will appreciate that the TID value may alternatively indicate a traffic stream including the set of data corresponding to a particular application (e.g., voice-over-IP, streaming video, email, etc.).

As such, the frame generation module 40 may introduce a route attribute value within the route request frame. The route attribute value is selected based on received data frame. The route attribute value may designate route operating parameters including, but not limited to, maximum throughput, minimum latency, minimum hops, or power saving (PS) nodes (i.e., nodes in a power saving mode of operation). In other words, the route attribute value corresponds to a route parameter indicative of the transmission efficiency of a particular type of data frame through the mesh network 10.

For the sake of simplicity and brevity, the present disclosure will discuss the discovery of simultaneous routes with regards to the transmission of voice data frames, which typically are associated with a desire for minimum latency and image data frames, which typically are associated with a desire for maximum throughout. Furthermore, in the present implementation, each attribute field includes a 2-bit value though various field sizes and values are anticipated.

Figure 3:
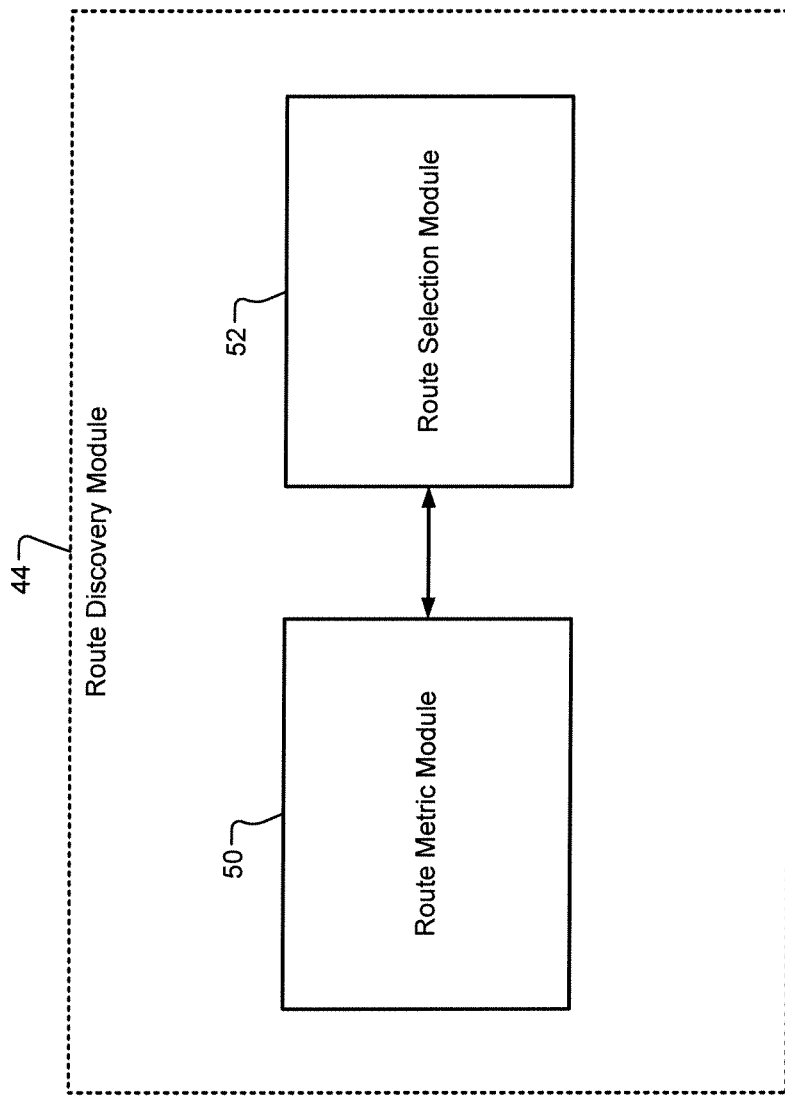
FIG. 3 is a functional block diagram of an exemplary route discovery module according to the present disclosure.

FIG. 3 depicts the route discovery module 42 of the exemplary mesh node 14 in more detail. The route discovery module 42 includes a route metric module 50 and a route selection module 52. The route metric module 50 and the route selection module 52 selectively communicate with the BBP 32, the other SOC components 36, as well as the RF transceiver 38. The route selection module 52 will be described in more detail below with reference to the route selection operation performed by an exemplary destination node 14 (e.g., mesh node 14-10).

As mentioned above, a route metric value represents an evaluation of a distinct route operating parameter indicative of the performance of a given route for a particular type of data. As a route request frame propagates within the mesh network 10, the route metric modules 50 of various intermediate nodes each update or revise a route metric value of their received route request frame. The route metric value is associated with the attribute value embedded in the route request frame. In other words, each intermediate node 14 that receives a given route request frame increments a route metric value within its received route request frame with the cost associated with the link between the intermediate node 14 and the previous node 14.

For example, the mesh node 14-2 (i.e., a source node) may determine that voice data needs to be transmitted to the mesh node 14-10 (i.e., the destination node). As such, the mesh node 14-2 may generate and broadcast a route request frame req-1 including a route attribute field value identifying "minimum latency" as the desired route attribute (i.e., route parameter) for evaluation. The mesh node 14-5 (i.e., an intermediate node) may receive the route request frame req-1 destined for the mesh node 14-10 (i.e., the destination node) from the mesh node 14-2. The mesh node 14-5 then adds the delay (i.e., the cost) incurred due to the communication link between the mesh node 14-2 and the mesh node 14-5 to the route metric value of the route request frame req-1. This process is repeated (i.e., the route request frame req-1 is propagated and its route metric value is revised) until the route request frame req-1 is "heard" by the destination node 14-10. In the present example, this route is identified as "Route 1".

Furthermore, in the present example, another intermediate node 14 (e.g., the mesh node 14-6) along a distinct route (i.e., "Route 2") may hear the broadcast from the mesh node 14-2 and independently update a route metric value of a "copy" of the initial broadcast, namely a route request frame req-2. In similar fashion, the route request frame req-2 is propagated through the mesh network 10 until the route request frame req-2 is also received by the destination node 14-10. In other words, in the present example, two distinct potential routes, Route 1 and Route 2, are presented to the destination node 14-10.

In some implementations, the frame generation module 40 may generate a route request frame that includes identification data (e.g., traffic identifier data) indicative of the type of data to be transmitted from the source node along with a route metric value. As the route request frame propagates through the mesh network 10, a respective route metric module 50 of each intermediate node 14 may reference a correlation table (not shown) in order to first determine a route attribute (e.g., minimum number of hops) and then update or increment the route metric value. The correlation table may be resident at each mesh node 14, thereby providing a mapping scheme between the identification data and a desired route attribute.

In the present example, upon receiving the route request frames req-1 and req-2, the route selection module 52 of the destination node 14-10 compares the respective route metric values of the route request frames req-1 and req-2 to determine the route most suitably configured for the given route attribute. In other words, the route selection module 52 selects the route that minimizes the latency of data transmissions through the mesh network 10, thereby establishing the most efficient route to transmit voice data at that period in time. Although the route selection module 52 evaluates two potential routes in the present example, it is anticipated that the route selection module 52 may select among a variable number of potential routes.

The route selection module 52 of the destination node 14-10 communicates the route selection (e.g., Route 1) to the frame generation module 40 of the destination node 14-10. In response to the route request frame req-1, the frame generation module 40 initiates a route response operation and generates a route response frame that, similar to the route request frames described above, includes the route attribute field. The route response frame is unicast along the selected route back to the source node 14-2 that initiated the route request operation. In the present implementation, a forwarding table 44 at each intermediate node 14 is populated based on the route attribute as well as the destination address of the destination node 14-10, thereby establishing a route for transmitting voice data from the source node 14-2 to the destination node 14-10. Those skilled in the art will appreciate the route discovery operation (i.e., the route request operation in combination with the route response operation) described above may be repeated such that multiple routes corresponding to distinct route attributes (e.g., minimum latency and maximum throughout) are established simultaneously between a specific source and destination node within a given mesh network. In other words, distinct types of data may be transmitted via different routes between any two given nodes within a mesh network.

Figures 4, 5:
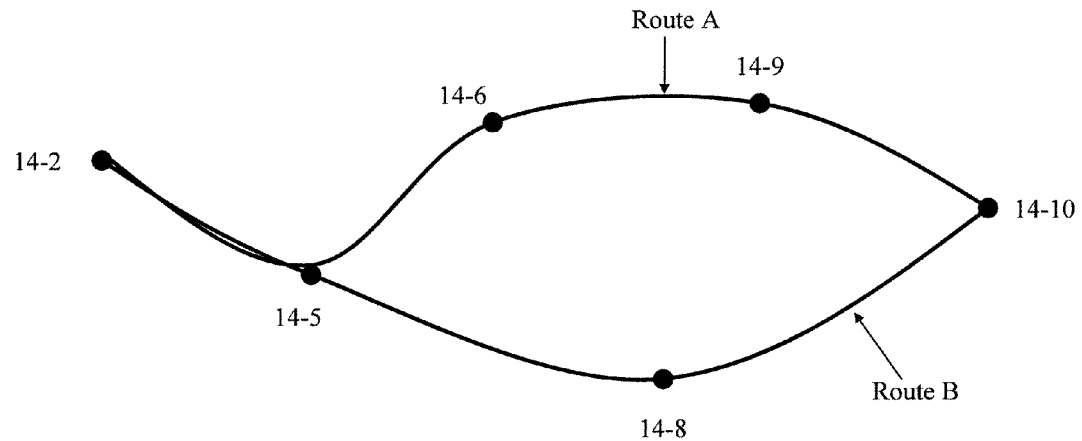
FIG. 4 illustrates simultaneous routes established within the exemplary mesh network according to the present disclosure.
FIG. 5 illustrates an exemplary forwarding table according to the present disclosure.

Referring now to FIG. 4, an exemplary mesh network implementing the route discovery system is discussed in more detail. FIG. 4 illustrates a simplified mesh network 10 in which multiple routes have been simultaneously established between the mesh node 14-2 (i.e., a source node) and the mesh node 14-10 (i.e., a destination node). In the present example, mesh node 14-2 determines that both voice and image data must be forwarded to mesh node 14-10. Utilizing the route discovery system described above, mesh node 14-2 determines that "Route A" established via mesh nodes 14-5, 14-6, and 14-9 maximizes the throughout of data to the mesh node 14-10 and that "Route B" established via mesh nodes 14-5 and 14-8 minimizes propagation delays of data to the mesh node 14-10. Thus, in the present example, image data received at the mesh node 14-2 is transmitted along Route A to the mesh node 14-10 whereas voice data received at the mesh node 14-2 is transmitted along Route B to the mesh node 14-10.

The mesh node 14-5 determines an appropriate route for transmission based on each specific data frame. As such, in the present implementation, each data frame may include a route attribute field in addition to a destination address. A respective forwarding module 43 of each mesh node 14 may then examine the route attribute field of the received data frame and proceed to transmit the received data frame along a corresponding route established within its respective forwarding table 44. In some embodiments, the route attribute field may be embedded within a set of reserved bits of a mesh header of the received data frame.

Alternatively, each respective forwarding module 43 may utilize a default mapping scheme (i.e., a route classifier) that establishes a correlation between various TID values embedded within received data frames and a plurality of route attributes. However, if a route has not been established for a given route attribute, a forwarding module 43 may utilize a route corresponding to a different data traffic type. Furthermore, if a forwarding module 43 fails to detect a route attribute field within a received data frame and no route classifiers have been formalized, the forwarding module 43 may employ a default route for the destination address to transmit received data frames.

As mentioned above, the route discovery system provides for a forwarding table 44 at each intermediate node 14 along a given route. In the present implementation, each forwarding table 44 stores an address of the next mesh node 14 (i.e., the "next hop") along an established route to a destination node based on a route attribute and an address of the destination node. As such, in the present implementation, the forwarding table 44 references both a destination address (DA) and a route attribute to determine the next hop of an established route. FIG. 5 illustrates an excerpt of the forwarding table 44 of the mesh node 14-5 in accordance with the exemplary routes depicted in FIG. 4.

Figure 6A:
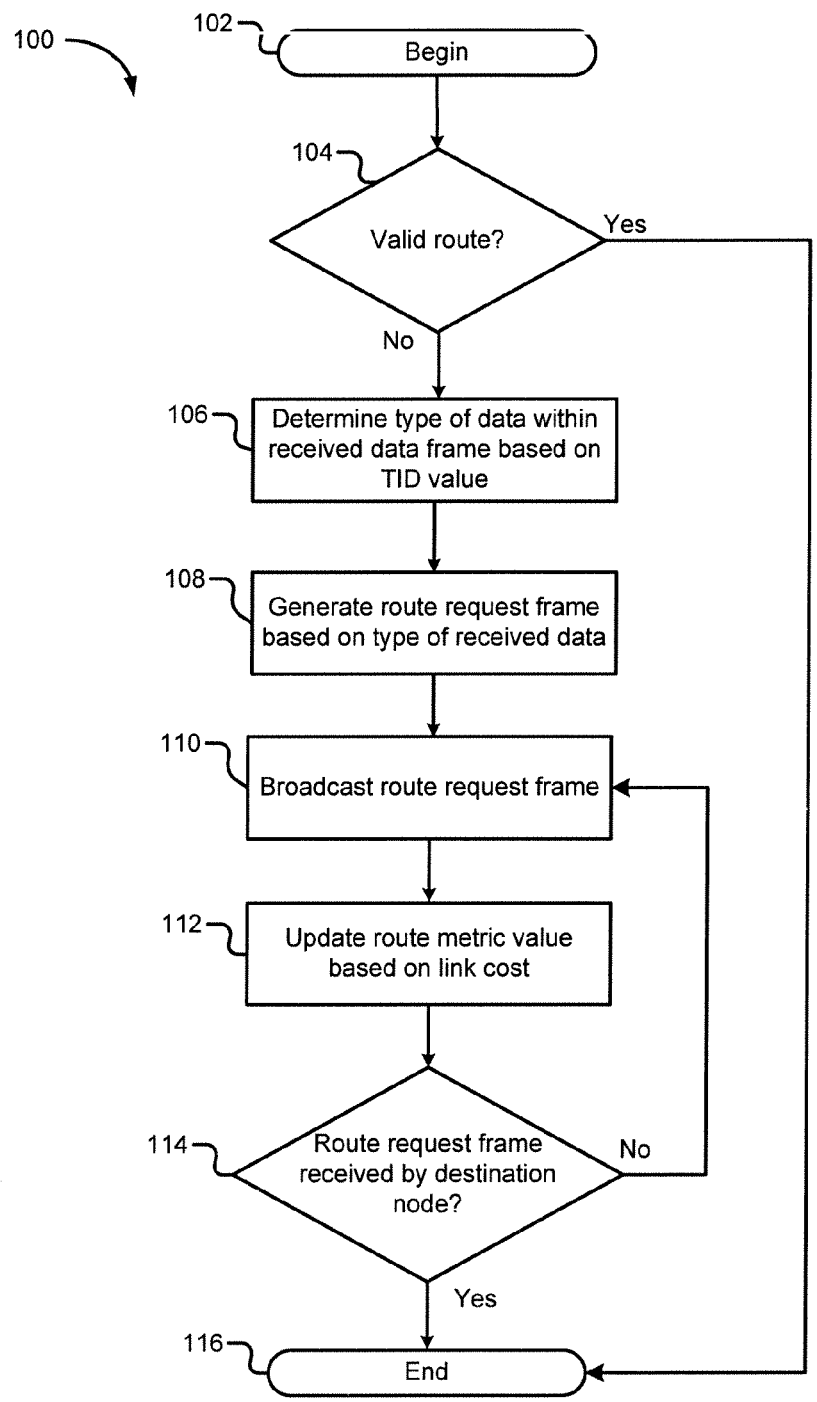
FIG. 6(a) is a flow diagram illustrating steps of an exemplary route request operation according to the present disclosure.

Referring to FIG. 6(a), a method 100 of performing a route request operation is shown in more detail. The method 100 begins at step 102. In step 104, the MAC device 34 of an exemplary mesh node 14 determines whether a valid route exists to transmit a received data frame. If the MAC device 34 determines that a valid route exists, the method 100 proceeds to step 116. If the MAC device 34 determines that a valid route does not exist, the method proceeds to step 106.

In step 106, the frame generation module 40 of the exemplary mesh node 14-2 determines a type of data within the received data frame. In step 108, the frame generation module 40 of the mesh node 14-2 generates a route request frame based on the type of data within the received data frame. In step 110, the mesh node 14-2 broadcasts the route request frame within the mesh network 10.

In step 112, a route metric module 42 of an intermediate node updates or revises the route metric value within the route request frame based on the link cost. In step 114, the method 100 determines whether the route request frame has been received by the destination node. If the route request frame has not been received by the destination node, the method 100 returns to step 110. If the route request frame has been received by the destination node, the method 100 proceeds to step 116. In step 116, the method 100 ends.

Figure 6B:
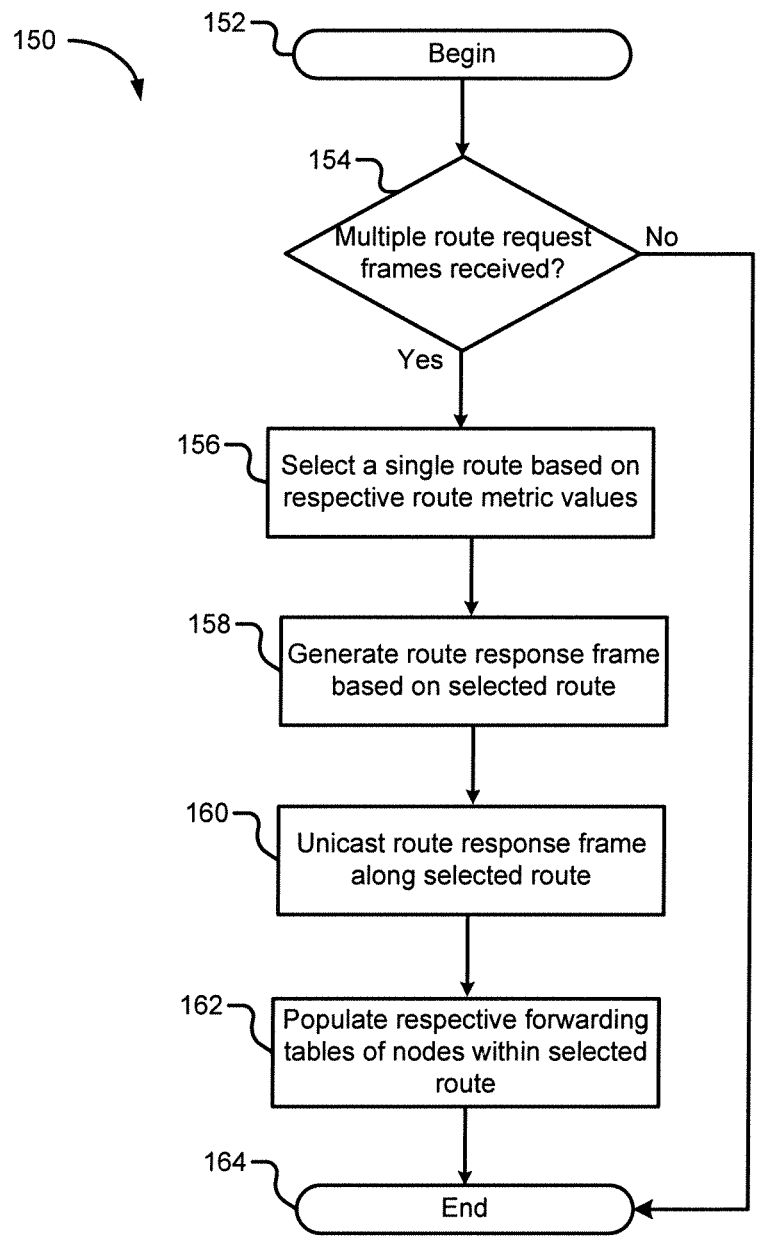
FIG. 6(b) is a flow diagram illustrating steps of an exemplary route response operation according to the present disclosure.

Referring to FIG. 6(b), a method 150 of performing a route selection and response operation is shown in more detail. The method 150 begins at step 152. In step 154, the MAC device 34 of an exemplary destination node determines whether the multiple route request frames have been received. If the MAC device 34 determines that multiple route request frames have not been received, the method 150 proceeds to step 164. If the MAC device 34 determines that multiple route request frames have been received, the method proceeds to step 156.

In step 156, the route selection module 52 of the destination node selects at least one route among the multiple routes which are respectively associated with the multiple route request frames based on a comparison of route metric values within the each of the multiple route request frames. In step 158, the frame generation module 40 of the destination node generates a route response frame based on the selected route (i.e., the selected route metric value).

In step 160, the destination node unicasts the route response frame along selected route. In step 162, a respective MAC device 34 of each intermediate node along the selected route populates its respective forwarding table 44 based on a route attribute carried in the route response frame and the address of the destination node. In step 164, the method 150 ends.

Figure 6C:
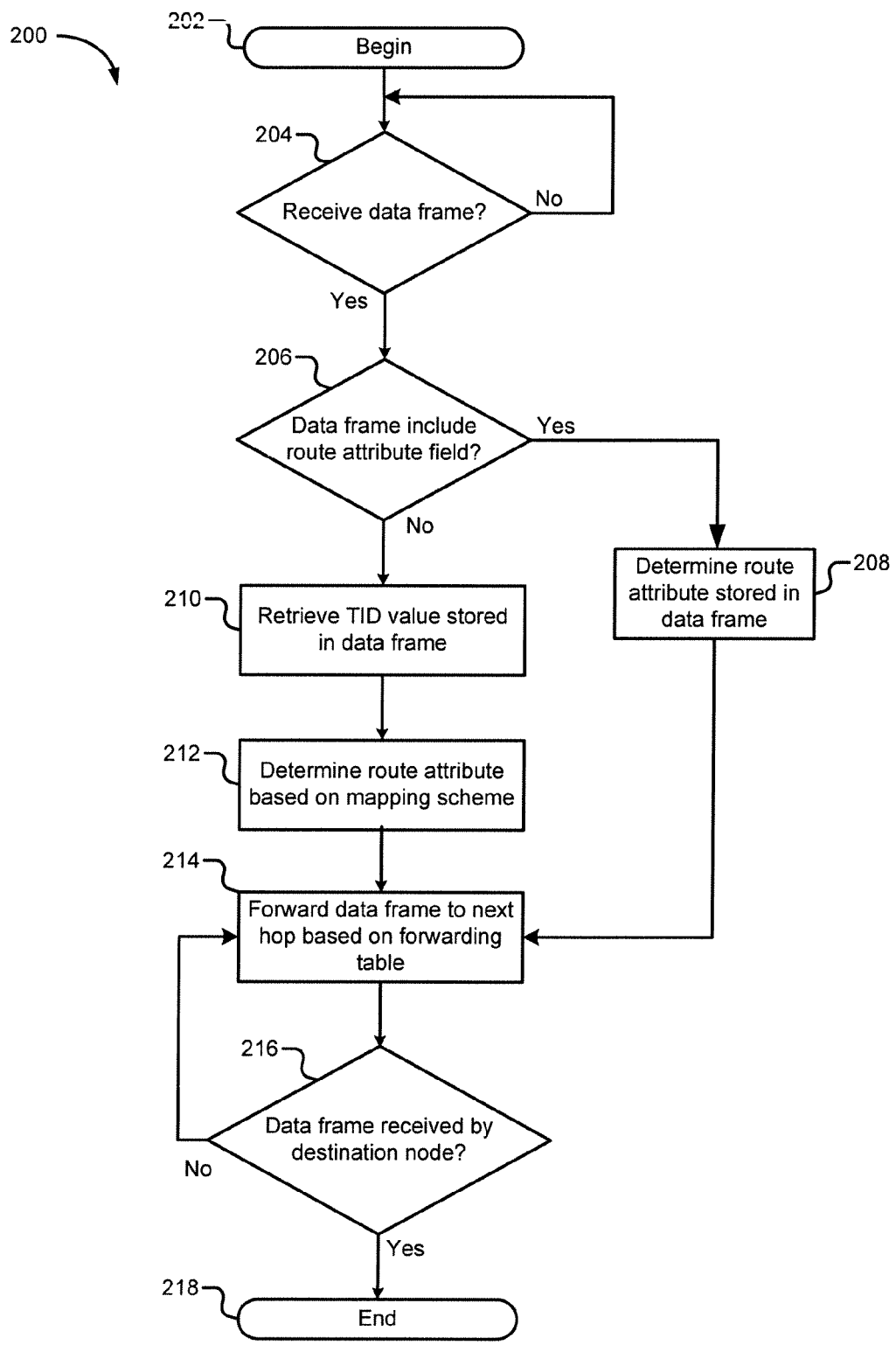
FIG. 6(c) is a flow diagram illustrating steps of a data transmission operation according to the present disclosure.

Referring to FIG. 6(*c*), a method 200 of transmitting data is shown in more detail. The method 200 begins at step 202. In step 204, the MAC device 34 of the exemplary mesh node 14-2 determines whether the mesh node 14-2 has received a data frame. If the MAC device 34 determines that the mesh node 14-2 has not received a data frame, the method 200 returns to step 204. If the MAC device 34 determines that the mesh node 14-2 has received a data frame, the method proceeds to step 206.

In step 206, the MAC device 34 determines whether the received data frame includes a route attribute field. If the MAC device 34 determines that the received data frame includes a route attribute field, the method 200 proceeds to step 208. If the MAC device 34 determines that the received data frame does not include a route attribute field, the method 200 proceeds to step 210.

In step 208, the MAC device 34 determines the route attribute value stored in the received data frame. In step 210, the MAC device 34 determines a TID value stored in the received data frame. In step 212, the MAC device 34 utilizes a mapping scheme to determine the route attribute value corresponding to the TID value of the received data frame. In step 214, the MAC devices 34 of the mesh node 14-2 and the respective MAC devices 34 of each of the intermediate nodes operate to forward the received data frame to the "next hop" based on respective forwarding tables 44.

In step 216, the method 200 determines whether the data frame has been received by the destination node. If the data frame has not been received by the destination node, the method 200 returns to step 214. If the data frame has been received by the destination node, the method 200 proceeds to step 218. In step 218, the method 200 ends.

All of the discussion above, regardless of the particular implementation being described, is exemplary in nature, rather than limiting. Although specific components of the route discovery system are described, methods, systems, and articles of manufacture consistent with the route discovery system may include additional or different components. For example, components of the route discovery system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the route discovery system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A mesh network comprising:
a first mesh node and a second mesh node,
wherein the first mesh node comprises:
   a data interface configured to receive a data frame that includes data comprising one of voice data or image data, the data frame to be transmitted from the first mesh node to the second mesh node along one of a plurality of routes discovered with a plurality of route request frames; and
   a route request frame generation module configured to:
      determine a type of the data included in the data frame as voice data or image data, the type of the data included in the data frame being determined for generation of the plurality of route request frames;
      select a route attribute for generation of the plurality of route request frames, the route attribute being selected based on whether the type of the data included in the data frame comprises voice data or image data, the route attribute being indicative of a quality of transmission for the type of the data; and
      generate the plurality of route request frames based on the selected route attribute,
      wherein, for each route request frame, the route request frame generation module is configured to:
         include a route attribute value associated with the selected route attribute in the route request frame, and
         include a route metric value associated with the route attribute value in the route request frame, the route metric value representing an evaluation of the route attribute, and
wherein the second mesh node comprises:
   a transceiver configured to receive a subset of the plurality of route request frames, the subset of the plurality of route request frames having a common route attribute and each route request frame of the subset having a respective route metric value, each respective route metric value being based on a distinct evaluation of the common route attribute within a respective route; and
   a route selection module configured to select at least one route of the plurality of routes based on the common route attribute and the respective route metric values indicated in the subset of route request frames.

2. The mesh network of claim 1 further comprising a route metric module of a third mesh node that adjusts a route metric value of one of the plurality of route request frames based on a communication link between the third mesh node and the first mesh node.

3. The mesh network of claim 1 wherein the second mesh node further comprises a frame generation module that generates a route response frame that specifies the common route attribute.

4. The mesh network of claim 3 further comprising a forwarding table at each mesh node of a subset of the plurality of mesh nodes within the at least one selected route, each forwarding table being populated based on the common route attribute.

5. The mesh network of claim 4 wherein each forwarding table includes an address of a next mesh node among the subset of mesh nodes within the at least one selected route.

6. A media access control (MAC) device for a destination mesh node in a mesh network having a plurality of mesh nodes, the MAC device comprising:
 a transceiver configured to receive a plurality of route request frames from a source mesh node in the mesh network, the plurality of route request frames transmitted by the source mesh node to discover a route of a plurality of routes for transmission of a data frame that includes data comprising one of voice data or image data, wherein each of the plurality of route request frames includes:
  a common route attribute value associated with a common route attribute, the common route attribute selected by the source mesh node based on whether a type of data included in the data frame comprises voice data or image data, wherein the common route attribute is indicative of a quality of transmission for the type of the data; and
  a respective route metric value associated with the common route attribute value and representing a distinct evaluation of the common route attribute within a respective route; and
 a route selection module configured to select the route of the plurality of routes based on the common route attribute and the respective route metric values, and
 wherein the transceiver is further configured to transmit a route response frame to the source mesh node indicating the route selected by the route selection module.

7. The device of claim 6 wherein the type of data within the data frame is determined based on a traffic identifier (TID) value within the data frame.

8. The device of claim 7 wherein the common route attribute value is determined based on the TID value.

9. A route discovery method for use with a plurality of mesh nodes within a mesh network, comprising:
 receiving a data frame that includes data comprising one of voice data or image data, the data frame to be transmitted from a first mesh node to a second mesh node along one of a plurality of routes discovered with a plurality of route request frames;
 determining a type of the data included in the data frame as voice data or image data for generating the plurality of route request frames;
 selecting a route attribute for generating the plurality of route request frames, the selecting of the route attribute based on whether the type of the data included in the data frame comprises voice data or image data, the route attribute being indicative of a quality of transmission for the type of data;
 generating the plurality of route request frames based on the selected route attribute, wherein generating the plurality of route request frames comprises, for each route request frame, including a route attribute value associated with the route attribute in the route request frame;
 adjusting a route metric value of one of the plurality of route request frames based on a communication link between a third mesh node and the first mesh node, the route metric value being associated with the route attribute value and representing an evaluation of the route attribute;
 receiving a subset of the plurality of route request frames, the subset of the plurality of route request frames having a common route attribute and each route request frame of the subset having a respective route metric value, each respective route metric value being based on a distinct evaluation of the common route attribute within a respective route; and
 selecting at least one route of the plurality of routes based on the common route attribute and the respective route metric values.

10. The method of claim 9 further comprising determining the type of data within the data frame based on a traffic identifier (TID) value within the data frame.

11. The method of claim 9 further comprising selecting at least one of the plurality of routes based on a comparison among the respective route metric values of the plurality of routes.

12. The method of claim 9 further comprising generating a route response frame that specifies the common route attribute.

13. The method of claim 12 further comprising populating a forwarding table at each mesh node of a subset of the plurality of mesh nodes within the at least one selected route, each forwarding table being populated based on the common route attribute.

14. The device of claim 1, wherein the route attribute comprises latency when the type of data comprises voice data, and comprises throughput when the type of data comprises image data.

15. The method of claim 9, wherein the route attribute comprises latency when the type of data comprises voice data, and comprises throughput when the type of data comprises image data.

* * * * *